United States Patent [19]

Fichtner et al.

[11] Patent Number: 5,213,436
[45] Date of Patent: May 25, 1993

[54] SPRING JOINT FOR PIVOTALLY CONNECTING TWO BODIES

[75] Inventors: Karl-Heinz Fichtner, Strande; Kurt Brenner, Satteldorf Gröningen, both of Fed. Rep. of Germany

[73] Assignee: Anschutz & Co. GmbH, Kiel, Fed. Rep. of Germany

[21] Appl. No.: 739,469

[22] Filed: Aug. 2, 1991

[30] Foreign Application Priority Data

Aug. 2, 1990 [DE] Fed. Rep. of Germany ....... 4024494

[51] Int. Cl.⁵ ............................................. F16B 21/00
[52] U.S. Cl. .................................... 403/220; 403/291;
74/5 F; 267/154; 267/279
[58] Field of Search ............... 403/291, 220; 74/5 F;
207/279, 281, 154; 464/170, 185

[56]          References Cited
U.S. PATENT DOCUMENTS

| H518 | 9/1988 | Gentiluomo | 267/154 |
|------|--------|------------|---------|
| 3,276,762 | 10/1966 | Thomas | 267/154 |
| 3,290,949 | 12/1966 | Samet | 403/291 X |
| 3,339,909 | 9/1967 | Hanslip et al. | 267/154 X |
| 3,420,582 | 1/1969 | Shelley | 403/291 |
| 3,479,888 | 11/1969 | Litman et al. | |
| 3,815,685 | 6/1974 | Seifert, Jr. | 267/154 X |
| 3,825,992 | 7/1974 | Troeger | 403/291 X |
| 3,909,077 | 9/1975 | Leonarduzzi | 403/291 |
| 4,126,046 | 11/1978 | Erdley | 74/5 F |
| 4,310,303 | 1/1982 | Collier | |
| 4,336,967 | 6/1982 | Hojo et al. | 403/291 |
| 4,479,786 | 10/1984 | De Bisschop | |
| 4,781,364 | 11/1988 | Finn et al. | 267/279 |
| 4,812,072 | 3/1989 | Brooks | |
| 5,062,619 | 11/1991 | Sato | 267/154 |

FOREIGN PATENT DOCUMENTS

2525530 1/1976 Fed. Rep. of Germany .
2653427 6/1978 Fed. Rep. of Germany .

Primary Examiner—Dave W. Arola
Assistant Examiner—Heather Chun
Attorney, Agent, or Firm—Walter Ottesen

[57]              ABSTRACT

The invention is directed to a spring joint having two holding bodies. The spring joint is fixedly attached to a base at one of the holding bodies. The second holding body is provided for the attachment of a component which is intended to undergo a pivot movement relative to the base during operation. A spring element acts as a connecting body between the two holding bodies. A stop is mounted on the spring joint so that the spring joint can be used again after impact loads or intermittent vibration. This stop includes at least one stop body which limits the movement range of the spring body in the spring joint for radial and axial load to the elastic range.

10 Claims, 6 Drawing Sheets

SPRING JOINT FOR PIVOTALLY CONNECTING TWO BODIES

FIELD OF THE INVENTION

The invention relates to a spring joint for pivotally connecting two bodies which includes two holding bodies connected to each other by at least one spring body.

BACKGROUND OF THE INVENTION

Spring joints are especially suitable for providing a pivotable connection of two bodies since they function with a very high reproducibility. Spring joints are known wherein several leaf springs are mounted in the interior of two spring action is provided essentially in only one plane and they have a negligible spring action in the direction perpendicular to this plane. For this reason, especially spring joints or spring bearings having a predirected force can be made. Such spring joints permit the radial/axial support of bodies or components in an essentially precise friction-free, play-free, low-hysteresis, wear-free and dry manner with the bodies requiring a limited freedom of rotation and which bodies must be driven under extreme environmental conditions (dirt, cold, heat, vacuum, vibration, shock).

These spring joints find a wide application as supports in sensors which, for example, measure displacements, angles, torques, forces and the like and are built into measuring devices, machines, microscales, gyroscope devices (here especially for rate gyros and dynamically matched gyroscopes as frame or cardanic bearings). Spring joints of the kind described above are disclosed in German Patents 2,525,530 and 2,653,427 and U.S. Pat. No. 4,310,303.

Problems occur as a rule when dimensioning the spring joints in response to requirements as to load-carrying capacity (as high as possible) and rotation spring constants or directing force, return force (as low as possible).

The deflection is always a compromise since handling and transport requirements (for flying bodies and the like and such as the starting thereof) usually require a dimensioning for load-carrying capacity which lies well above the actual operating conditions.

However, the foregoing leads to undesired stiff bearings having associated therewith high return forces, reduced rotational angle freedom, greater hysteresis and the like.

For most applications, it is permissible and important that the bearings can be operated without being destroyed for the time interval of a time-limited load lying well above the normal operating conditions with the operation of the bearing being possibly limited in function (such as not being free of friction) if the full function is again provided thereafter or the function is only slightly affected.

SUMMARY OF THE INVENTION

It is an object of the invention to provide a spring joint wherein the dimensioning thereof is provided especially with respect to the spring constant and especially for the requirements of the operating conditions with other higher loads being held away from the springs as guide elements of the spring joint.

The spring joint of the invention is for pivotably connecting two holding bodies and includes: a first holding body; a second holding body; a resilient member having an elastic range through which the resilient member can bend and yet return to its original position; the resilient member interconnecting the holding bodies so as to permit the first holding body to move through a distance relative to the second holding body while bending the resilient member when a load is applied to the first holding body; and, stop body means for coacting with the first body to limit the bending of the resilient member to prevent the elastic range from being exceeded.

With the spring joint of the invention, it is no longer necessary to overdimension the spring joint with a spring body in its interior in order to still provide a functionally-operative spring joint even in the presence of shock loads such as for flying bodies and the like and especially during the start thereof. In this way, it is also possible to realize a high carrying capacity with a low return force (rotational spring constant or directional force) when dimensioning the spring joint with a minimal space requirement for the stop. This eliminates the dimensioning of the spring with respect to carrying capacity as was required up until now and which leads to a dimensioning of the spring action lying well above the actual operating conditions. The invention leads to spring bearings having return forces which are not unnecessarily high and which have a reduced rotational-angle freedom and a greater hysteresis because of their stiffness. The spring bearings provided with the stop nonetheless remain undestroyed with loads far exceeding the normal operating conditions and can be operated with limited function (such as non friction-free). After the end of the exceptional load, the springs then again provide their function as intended.

It is advantageous to configure the stop body so that it also provides protection against an axial movement (perpendicular to the spring action during normal function).

It is further advantageous if the holding body and the spring body of the spring joint are made of the same piece so as to define a monolithic component. For large temperature changes, it is advantageous if the monolithic spring joint and the stop are made of the same material. Leaf springs especially are suited as spring bodies in a spring joint since their manufacture can be conducted with great precision.

To ensure a long service life of the spring joint in the presence of frequently occurring overloads, it is advantageous to configure the stop surfaces of the stops so that they have an adequately large contact region when struck especially in the spring direction.

In an advantageous embodiment of the stop, the stop includes two rings mounted on the spring joint with an inner, smaller ring being placed within an outer larger ring. These rings are preferably connected directly or indirectly to the holding bodies of the spring joint such as with the aid of threaded fasteners.

According to another advantageous embodiment of the invention, the housing of the spring joint includes an outer extension within which at least one stop is mounted. This can also take place by means of a releasable connection.

By pretensioning the stop by a spring, a further insensitivity of the spring joint against shock is obtained. For this purpose, the spring includes a limiting body on the end thereof lying opposite the stop. The limiting body is rigidly attached to the outer extension.

BRIEF DESCRIPTION OF THE DRAWINGS

The invention will now be described with reference to the drawings wherein:

FIG. 2c is a front elevation view of the torsion rod of FIG. 2a;

DESCRIPTION OF THE PREFERRED EMBODIMENTS OF THE INVENTION

The problematic and the inventive concept of the invention is discussed with respect to FIGS. 1a to 1c and FIGS. 2a to 2d wherein a simple torsion rod (1, 3) is shown as a spring joint.

Figure 1A:
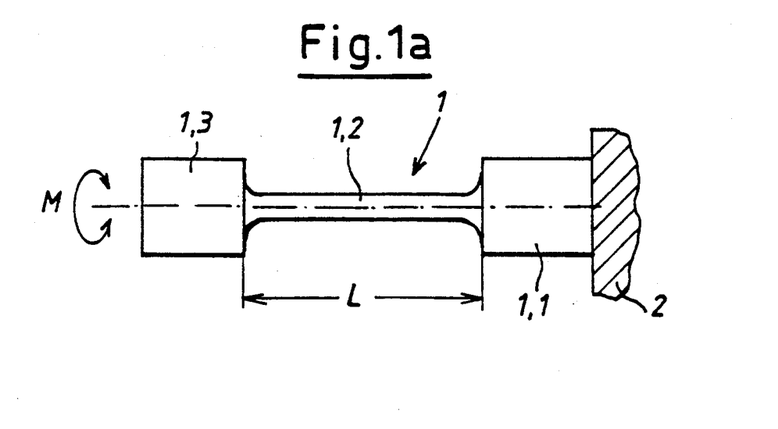
FIG. 1a is a side elevation view of a torsion rod.

The torsion rod 1 includes two holding bodies (1.1, 1.3) which are interconnected via a thin spring rod 1.2. The rod 1.2 is configured so as to be thickened at the connecting points to ensure a reliable connection of the rod 1.2 to the holding bodies (1.1, 1.3) with the rod here being shown as a round rod. One holding body 1.1 is rigidly attached to a stable base 2. A directional force torsion spring bearing is obtained in that a component (not shown) is mounted on the second holding body 1.3. This serves to provide a (radial/axial) bearing of the component which is precise, free of friction, free of play, free of wear and dry as well as being of low hysteresis. Also, a limited capacity for rotation is provided. This type of bearing is used in all situations where a drive takes place under extreme environmental conditions (dirt, cold, heat, vacuum, vibration, shock). Rotational torque M can occur when the torsion rod is loaded.

Figure 1B:
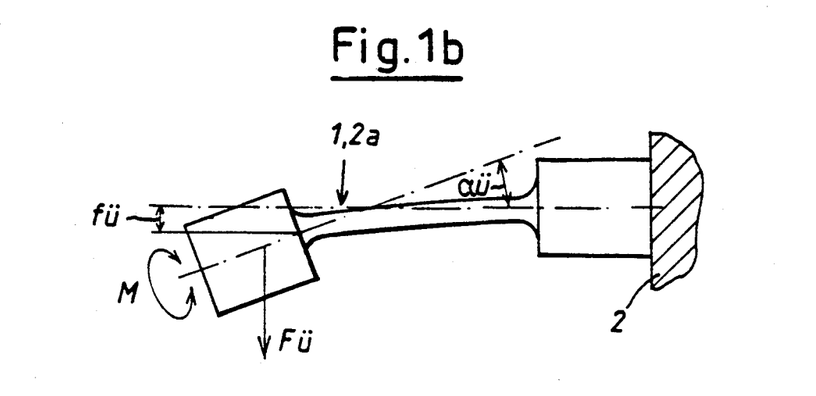
FIGS. 1b and 1c are side elevation views of the rod of FIG. 1a and show the action of a translatory deformation in the inelastic range after a shock load.
Figure 1C:
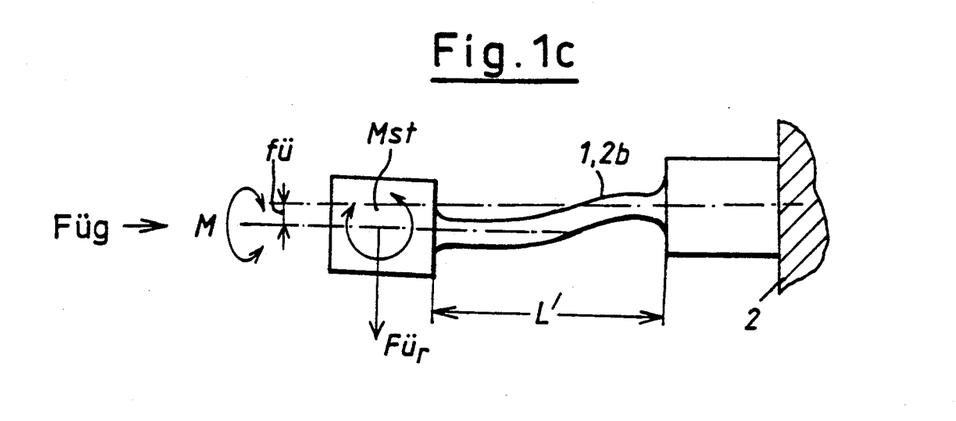

If the torsion rod 1 is deflected beyond the permissible range, then there can be no return to the initial position after the deflection has taken place. Rather, a residual deflection fü remains with the angle αü of the rod 1.2a. Furthermore, a permanent rotation of the rod 1.2a can take place so that the component can no longer assume its initial position relative to the base 2 when the deflecting load on the torsion rod 1 is no longer present. The overload Fü$_r$ can then lead to a permanent deformation of the torsion rod 1. A force Füg acting in the direction of the longitudinal axis from the component in a direction toward the base 2 or a disturbance torque M$_{St}$ lead to a deformation of the rod 1.2b after exceeding a specific loading. This deformation then becomes manifest as a shortened distance L' of the holding bodies (1.1, 1.3) to each other when the load is removed from the rod 1.2b. In addition, a permanent residual deflection fü occurs which is associated with a permanent rotation of the component relative to the base 2. The permanent effect after the load is then the same as though an overload Fü$_r$ were permanently applied to the holding body 1.3 of the component.

The range of movement of the torsion rod (1, 3) must be limited to prevent deflection of the torsion rod (1, 3) beyond the permissible range. FIGS. 2a to 2d show how this is done.

The torsion rod 3 comprises two holding bodies (3.1, 3.4) which are interconnected via a thin spring rod 3.2. The rod 3.2 is round and is thickened at its ends as shown in FIGS. 1a to 1c. One of the two holding bodies 3.1 is rigidly attached at a base 5. This holding body 3.1 has a smooth cylindrical form as the holding bodies (1.1, 1.3) shown in FIGS. 1a to 1c. In contrast, the holding body 3.4 for the component has a thickened portion 3.3 in the region of the holding body 3.4 with the thickened portion 3.3 being connected to the rod 3.2.

Figure 2A:
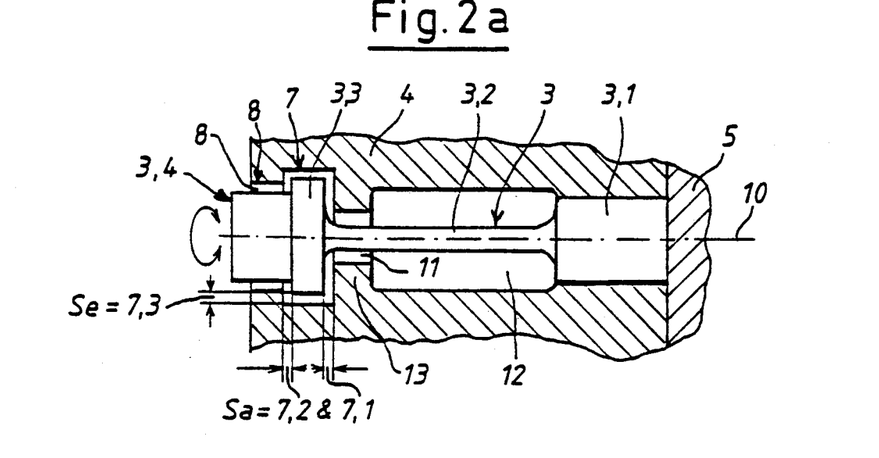
FIG. 2a is a side elevation view of a torsion rod arranged in a stop with the rod shown in its base position.

The torsion rod 3 is surrounded by a stop 4. This stop 4 is fixed and rigidly connected to the holding body 3.1 of the torsion rod 3 which, in turn, is connected to the base 5. Since the outer shape of the stop 4 is insignificant for its function, the outer contours of the stop 4 are not shown. The outer shape can be configured pursuant to the constructive conditions in the vicinity of the torsion rod 3. In this connection, it is significant that the stop 4 must withstand the forces occurring during use. This is especially significant with respect to the attachment of the holding body 3.1 to the base 5.

The stop 4 has an opening 12 in the region surrounding the rod 3.2 of the torsion rod 3. This opening 12 must be sufficiently large in order to ensure a free movement of the rod 3.2 for all permissible movements.

The opening 12 has a constricted portion 11 in the region ahead of the thickened portion 3.3 of the holding body 3.4 for the component. This constricted portion 11 has a length so that the stop 4 has a stable contact surface 13 for the thickened portion 3.3 of the holding body 3.4 for an axial overload. The narrow opening 11 extends into a larger opening 7 around the thickened portion 3.3 of the holding body 3.4. This opening 7 then reduces to a narrower outlet opening 8. The outlet opening 8 is then so configured that it permits a certain permissible rotation of the torsion rod 3 about the base axis 10 thereof.

Air gaps Se and Sa (7.1, 7.2, 7.3) must be present between the thickened portion 3.3 of the holding body 3.4 and the wall about the opening 7 and be sufficiently large in order to permit an undisturbed movement of the torsion rod 3 within the permitted range. The air gap Se (7.3) is dimensioned in correspondence to the movement range of the holding body 3.4 for the component so that the holding body 3.4 can come into contact engagement with the wall 8a of the outlet opening 8 without disturbance when the deflection about the base axis 10 is a maximum. This contact engagement should not take place as a point contact and for this reason, the outlet opening 8 in the direction toward the component is increased. This makes possible a line-like contact of the holding body 3.4 on the wall 8a of the outlet opening 8 which ensures a longer service life of the wall 8a as a contact surface.

In contrast, the air gaps Sa (7.1, 7.2) must be so dimensioned that the free movement of the torsion rod 3 is ensured on the one hand and, on the other hand, a deflection of the torsion rod 3 for an axial load in the direction toward the base (impact load) as well as in the direction toward the component (pull load) is prevented into the impermissible range by means of a contact surface (9.1, 9.2).

Figure 2B:
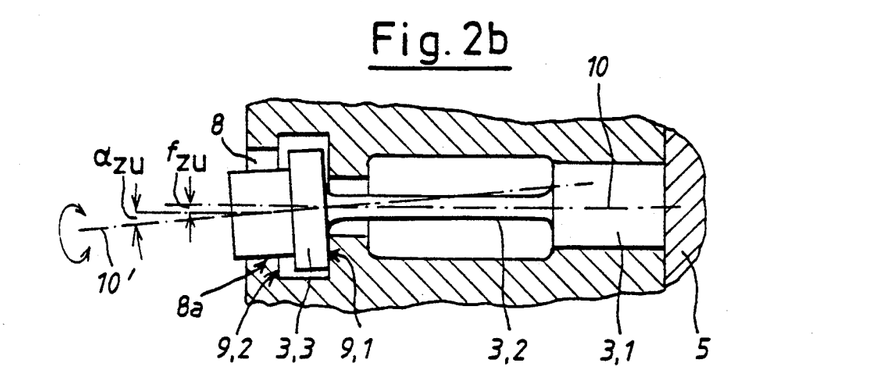
FIG. 2b shows the torsion rod of FIG. 2a responding to a blow applied thereto.

The condition that the torsion rod 3 can reliably fulfill its function even after an overload is ensured by limiting the freedom of movement of the torsion rod 3 in axial direction as well as in a direction approximately perpendicular thereto. The maximum permissible deflection fzu and the maximum permissible angles $\alpha zu$, $\beta zu$ are thereby not exceeded and only a permissible deflection axis 10' is obtained.

The material of the torsion rod together with the geometric configuration conjointly determines the maximum permissible movements. This material as well as the material of the stop are preferably made of mutually compatible materials such as spring steel and special bronze so as to especially minimize uneven expansions, impacts and rubbing.

Figure 2C:
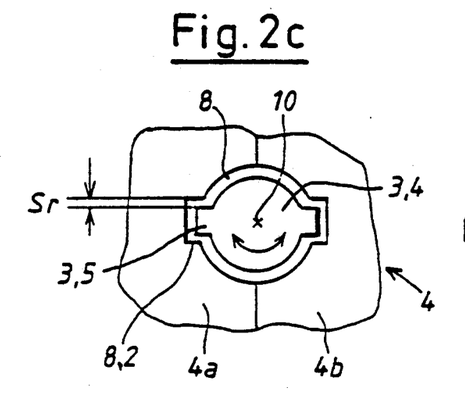
Figure 2D:
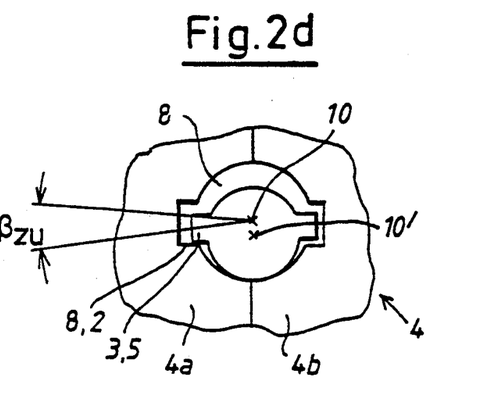
FIG. 2d is a front elevation view of the torsion rod as shown in FIG. 2b.

FIGS. 2c and 2d are front elevation views corresponding to FIGS. 2a and 2b, respectively. The component is omitted in the drawings to permit a clearer illustration of these embodiments.

FIG. 2c shows that the stop 4 is made of two parts (4a, 4b). After the torsion rod 3 is in the stop 4, the two parts (4a, 4b) are connected securely to each other. In the front elevation views of FIGS. 2c and 2d, the holding body 3.4 of the component has two rectangular extensions 3.5 which are arranged rotationally symmetrically to the base axis 10. These rectangular extensions 3.5 extend into corresponding cutouts of the stop 4. The extension 3.5 abuts against the limit wall of the cutout when there is a rotation of the holding body 3.4 about its base axis 10 when the permissible rotational angle $\beta zu$ is reached.

When dimensioning the cutout, attention must be given to the air gap St (8.2) (St=gap for tangential abutment) between the extension 3.5 and the side walls of the cutout so that the free lateral movement of the holding body 3.4 is not restricted.

Two additional embodiments of the invention will now be described in FIGS. 3a to 3e and FIGS. 4a to 4g which proceed from the inventive concept shown in FIGS. 2a to 2d.

Figure 3A:
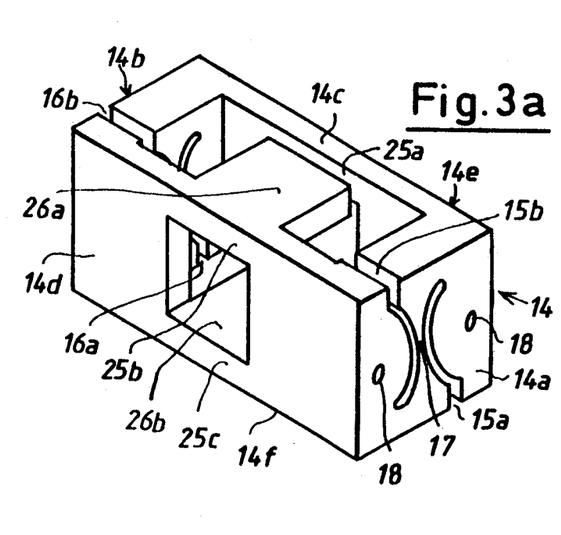
FIG. 3a shows a first monolithic leaf spring bearing without stops.

Two leaf springs 17 are included in a monolithic component in the spring bearing 14 shown in FIGS. 3a to 3e. In FIG. 3a, this spring bearing 14 is shown without the stops 27.

The spring bearing 14 comprises a right parallelopiped having two square end faces (14a, 14b) and four rectangular side faces (14c, 14d, 14e, 14f). This parallelopiped is substantially hollow in its interior. The connection between the two square end faces (14a, 14b) is provided by four parallelopiped-shaped connecting bodies of which only bodies 25a, 25b and 25c are visible in the perspective view of FIG. 3a. Lugs (26a, 26b) are provided on the connecting bodies.

Two notches (15a, 15b and 16a, 16b) are provided in each of the end faces (14a, 14b) of the spring bearing 14. Each of these slit-like notches (15a, 15b and 16a, 16b) starts from a side of the corresponding one of the end faces (14a, 14b) and extends for a first short segment parallelly to the lateral end face whereafter the notch extends into a second segment defining an arc as shown. The notches (15a, 15b and 16a, 16b) of the end faces (14a, 14b) start at opposite lying sides and are displaced with respect to the center line first toward the left and then toward the right with the same spacing also as shown.

A tapered portion is formed by this arrangement and configuration of the notches (15a, 15b and 16a, 16b) which is disposed between each two notches (15a, 15b and 16a, 16b) of the end faces (14a, 14b). This tapered section is narrowed and acts as a leaf spring 17. The circular arc-like course of the leaf spring 17 should be viewed as an advantageous form which can be conveniently manufactured and the course of the leaf spring 17 can, in another embodiment, have a different configuration. The leaf spring 17 is thickened toward its respective ends and therefore has an improved carrying capacity in the axial and radial directions. The leaf spring 17 can also be characterized as a circular arc spring. The two springs 17 of the spring bearing 14 have the same orientation with respect to their spring action and have the same spring force viewed in the context of manufacturing accuracy. The monolithic spring bearing 14 is made of a suitable material such as spring steel.

Figure 3B:
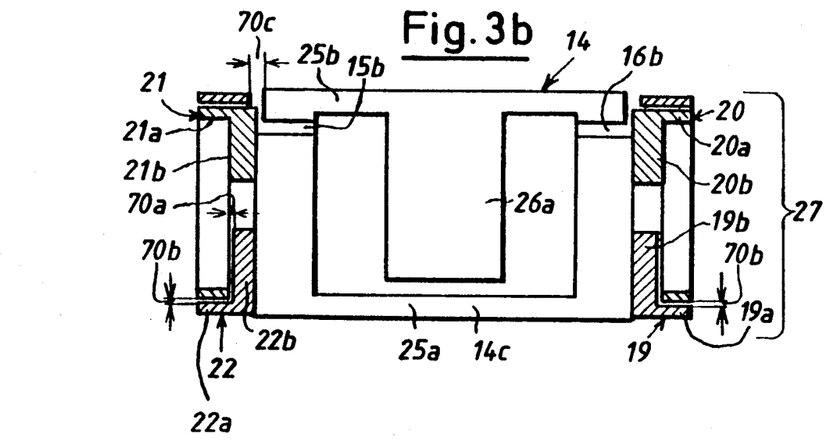
FIG. 3b shows the spring bearing of FIG. 3a with two stops at respective ends thereof with the stops being shown in section.
Figure 3C:
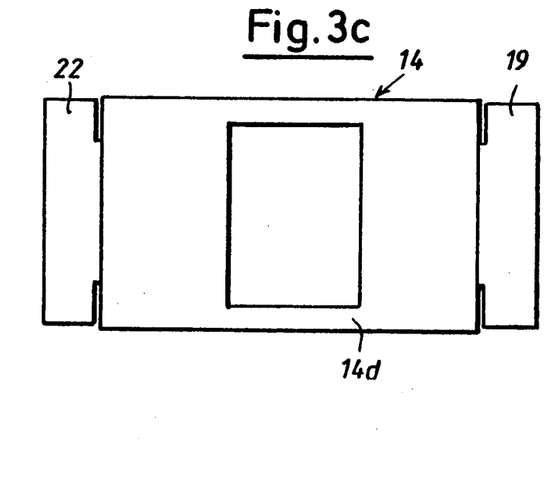
FIG. 3c is a side elevation view of the spring bearing of FIG. 3b.

Two threaded bores 18 are provided in each of the two end faces (14a, 14b) of the spring bearing 14 in addition to the two notches (15a, 15b and 16a, 16b). A stop 27 is attached to each end face (14a, 14b) via threaded fasteners (23, 24) which threadably engage the bores 18. In FIG. 3b, the spring bearing 14 is shown with stops 27 mounted on respective end faces (14a, 14b) with the stops 27 being shown in section to illustrate their operation.

The stops 27 essentially comprise respective sets of two ring-shaped bodies (20, 19 and 21, 22) with attachment lugs (19b, 20b and 21b, 22b) which are mounted along a side of the leaf spring 17 perpendicular to the transverse spring action of the spring 17. The two ring-shaped bodies (19, 20 and 21, 22) are arranged with respect to each other so that an outer ring-shaped body (19, 22) concentrically surrounds an inner ring-shaped body (20, 21). The inner ring-shaped body (20, 21) is so configured that its abutment ring (20a, 21a) closes with the outer abutment ring (19a, 22a) on the side facing away from the spring 17. In contrast, the abutment ring (20a, 21a) of the inner ring-shaped body (20, 21) on the side facing toward the spring 17 is lifted in the region outside of its attachment lug (20b, 21b) to the extent that the abutment ring (20a, 21a) does not collide with the attachment lug (19b, 22b) of the outer ring-shaped body (19, 22) when the spring 17 deflects in the permissible range. The permitted radial deflection range ($\simeq$ Sr) in the spring 17 is defined by the spacing 70b between the outer abutment ring (19a, 22a) and the inner abutment ring (20a, 21a).

The spacings (70a, 70b) between the stop 27 and the spring bearing 14 as well as between the outer ring-shaped bodies (19, 22) and the inner ring-shaped bodies (20, 21) must be so dimensioned that the movement of the spring 17 is limited to the permissible range in which no permanent deformation of the spring occurs. In contrast, the spacing 70c has no stop function.

Figure 3D:
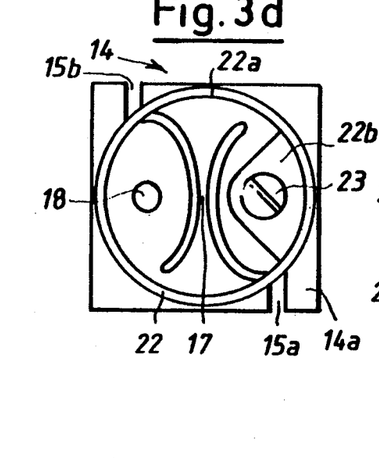
FIG. 3d is a front elevation view of the leaf spring bearing of FIG. 3a with a first stop ring mounted thereon.
Figure 3E:
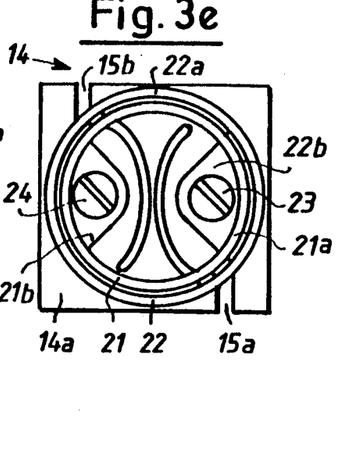
FIG. 3e is a front elevation view of the leaf spring bearing of FIG. 3a with both stop rings mounted thereon.

The assembly of the stop 27 is shown in FIGS. 3d and 3e. The outer ring-shaped body 22 having stop ring 22a is first connected to the spring bearing 14 at its attachment lug 22b via a threaded fastener 23. The threaded bores 18 for the screws (23, 24) are arranged perpendicularly to the expansion of the leaf spring 17 in order to obtain a maximum movement of both stop rings (22a, 21a) toward each other when there is a deflection of the spring 17.

After the outer ring-shaped body 22 is attached to the end face 14a of the spring bearing 14, the inner ring-shaped body 21 within the stop ring 22a is attached to the end face 14a of the spring bearing 14 at the attachment lug 21b via a threaded fastener 24. With this assembly, care must be taken that the spacing between the outer and the inner stop rings (21a, 22a) is uniform along the peripheral length thereof.

After the stop 27 is assembled, the spring 17 of the spring bearing 14 is now protected against radial deflection in the impermissible region. However, protection against axial shock is also provided since the inner stop ring 21a strikes the attachment lug 22b of the outer ring-shaped body 22 when there is an axial impact. In dependence how often or intensive such axial overloads are, the constructive configuration of the inner stop ring 21a can be accommodated to take account of this condition. For this purpose, the inner stop ring 21a is extended in the direction toward the end face 14a of the spring bearing 14 such that the stop ring 21a lies against the end face 14a of the spring bearing 14 when there is an axial overload. A shortened expansion of the inner stop ring 21a perpendicular to the end face 14a of the spring bearing 14 takes place only in the region of the attachment lug 22b of the outer ring-shaped body 22 and in the region surrounding this attachment lug 22b with the latter region being necessary for the permitted movement of the spring 17. Also, there is a contact engagement of the inner stop ring 21a on the attachment lug 22b of the outer ring-shaped body 22.

The assembly of the second stop 27 to the other end face 14b of the spring bearing 14 takes place in correspondence to the assembly shown in FIGS. 3d and 3e.

Figure 4A:
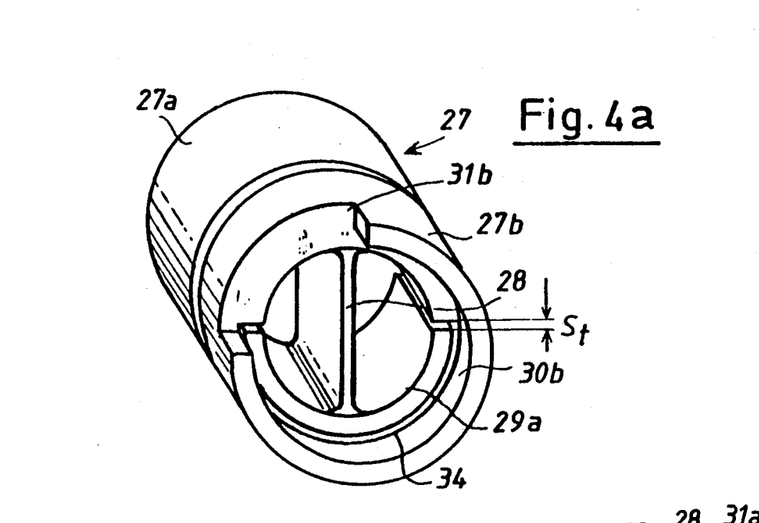
FIG. 4a is a perspective view of a second monolithic leaf spring bearing shown without stops.
Figure 4B:
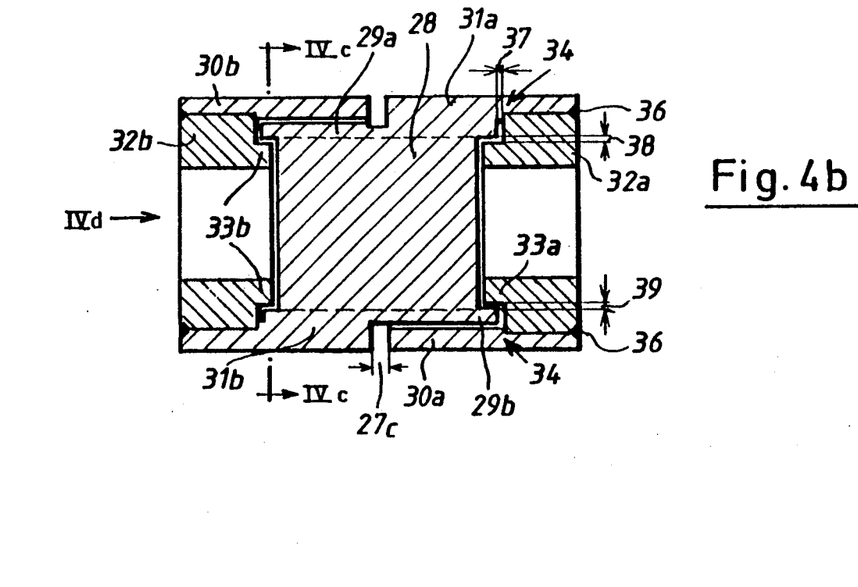
FIG. 4b is a leaf spring bearing of FIG. 3a shown together with welded stop bodies.
Figure 4C:
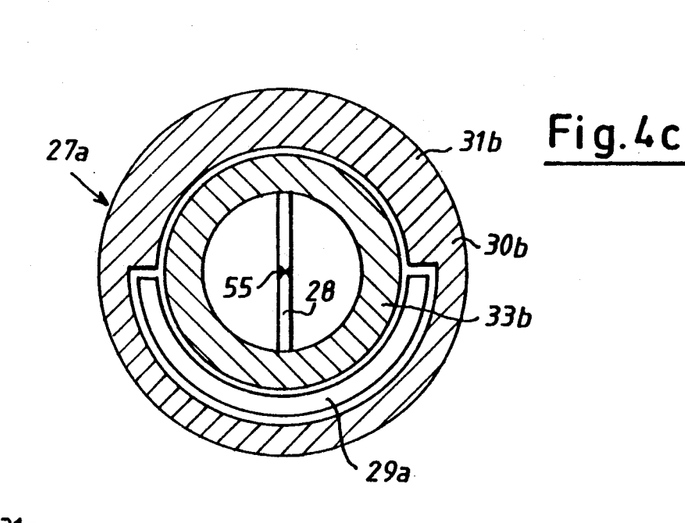
FIG. 4c is a vertical section view of the leaf spring bearing of FIG. 4b.

The monolithic spring joint 27 shown in FIGS. 4a to 4c has a straight cylindrical shape. High quality spring material is suitable as a material.

The spring joint 27 comprises two holding bodies (27a, 27b) having also a straight circular cylindrical form which are arranged one behind the other at a predetermined spacing 27c along the common normal of the circular surfaces. A leaf spring 28 is provided as a connecting element between the two holding bodies (27a, 27b).

Each of the two holding bodies (27a, 27b) has at one end a thinned extension (29a, 29b) on a segment of the circular periphery. This extension (29a, 29b) extends into the interior hollow space of the other holding body (27b, 27a). The extensions (33a, 33b) of the stop body (32a, 32b) can be only so long that between them and the spring 28 there always remains a safety gap 39 when in the rotated end position of the stop body (32a, 32b).

Furthermore, the outer diameter of the extensions (33a, 33b) of the stop body (32a, 32b) must be less than the inner diameter between the extension (29a, 29b) and a thickened portion (31a, 31b) of both holding bodies (27a, 27b). The extension (29a, 29b) extends from the thickened portion (31a, 31b) of the holding body (27a, 27b) at its rearward portion. The thickened portion (31a, 31b) as well as the extension (29a, 29b) have a surface directed toward the cylindrical axis 55 which surface has an arcuate portion directed outwardly.

The leaf spring 28 is attached at the inner hollow space of both holding bodies (27a, 27b) at the extensions (29a, 29b) as well as at the thickened portions (31a, 31b) of both holding bodies (27a, 27b) with the leaf spring 28 being thickened along its connecting line for ensuring a good attachment. Viewed in the context of manufacturing considerations, the leaf spring is machined from a massive block of material. The leaf spring 28 does not extend entirely to the ends of the extensions (29a, 29b) and the thickened portions (31a, 31b) of the two holding bodies (27a, 27b) and instead terminates a short distance in advance thereof. The thickened portions (31a, 31b) of the two holding bodies (27a, 27b) are tapered to a relatively narrow circular cylindrical ring (30a, 30b) in the region laterally of and below where the leaf spring 28 is attached. The gap St defines a rotation stop which acts as a torque limit. A symmetrical configuration of the gap St at both ends of the leaf spring 28 is necessary so that only force pairs act and no individual forces occur.

Figure 4D:
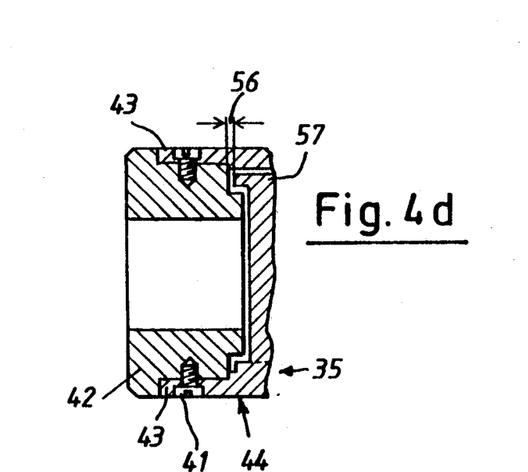
FIG. 4d shows the leaf spring bearing of FIG. 4a with a stop body attached via threaded fasteners thereto.

FIG. 4a shows the spring joint 27 without the stop arrangement. The stop bodies (32a, 32b) are shown in FIGS. 4b and 4d. A stop body (32a, 32b) of the stop arrangement is mounted on each of the ends of the leaf spring 28 at the interior of both holding bodies (27a, 27b).

The stop bodies (32a, 32b) each have the form of a circular cylinder which has an outer ring-shaped thinned portion in the form of a circularly-shaped extension (33a, 33b). A stop body (32a, 32b) is inserted into each one of the extensions (29a, 29b) of the holding bodies (27a, 27b) without play in order to absorb axial impacts from both ends of the spring joint 27. Thereafter, the stop bodies (32a, 32b) are fixed in their respective positions to the extensions (29a, 29b) via welding points 36.

The stop bodies (32a, 32b) must be at a certain distance 37 especially with respect to the extensions (29a, 29b) of the holding bodies (27a, 27b) to ensure that the stop bodies (32a, 32b) can carry out their tasks. The extensions (29a, 29b) of the holding bodies (27a, 27b) have a stop 34 in their interior up to which the stop bodies (32a, 32b) can be inserted in an extension (29a, 29b) to ensure this spacing 37 for limiting the axial spring movement. However, an adequately large spacing 38 must be provided between the stop bodies (32a, 32b) and the extensions (29a, 29b) and the thickened portions (31a, 31b) of the holding bodies (27a, 27b). This spacing 38 is needed so that the space for radial movement of the leaf spring 28 is not limited already in advance of the desired stop of the extensions (29a, 29b) of the holding bodies (27a, 27b) on the stop bodies (32a, 32b).

FIGS. 4a to 4c show the stop bodies (32a, 32b) as being fixed securely to the extensions (29a, 29b) of the holding bodies (27a, 27b) via weld points 36. The attachment can also be made releasable instead of being fixed in this manner. For this purpose, several threaded fasteners 41 arranged in the extensions 43 of the spring joint 44 can threadably engage threaded bores in the stop body 42 as shown in FIG. 4d. In this way, it is possible to change the spacing 56 between the stop body 42 and the extension 57 of the holding body 35 by exchanging different stop bodies 42 having different lengths in the direction of the cylinder axis within certain limits. The stop body itself can be provided with an external thread which corresponds to the internal thread in the extensions of the holding bodies since rotationally-symmetrical conditions are present. However, all other types of attachment can be equally well used which ensure a tight seating of the stop body in the holding body.

An orientation of the stop body (32a, 32b; 42) in FIGS. 4a to 4d is not necessary when the stop body (32a, 32b; 42) is intended to protect the leaf spring 28 only against axial impacts along the cylindrical axis 55 and axial impacts perpendicular to the plane of the leaf spring 28. This orientation is then however necessary when the stop body 57 has circularly-shaped projections (58a, 58b) which are intended to limit the space for movement of the spring 59 in the normal direction of movement of the spring. This is performed by the stop body 57 shown in FIGS. 4e and 4f.

Figure 4E:
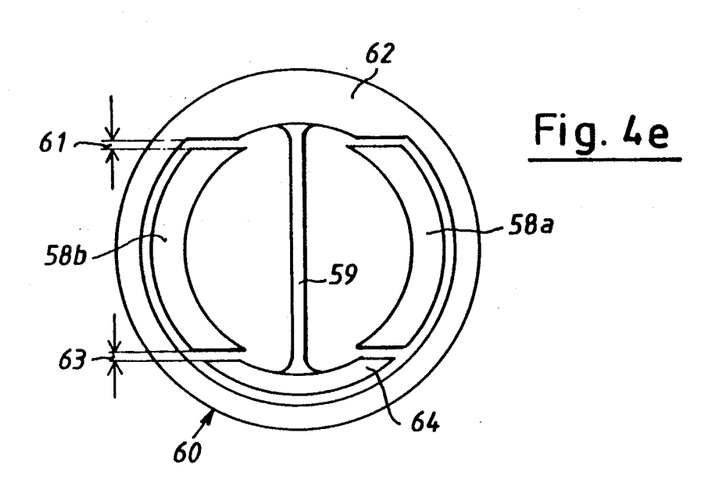
FIG. 4e shows the leaf spring bearing of FIG. 4a equipped with modified stop bodies.
Figure 4F:
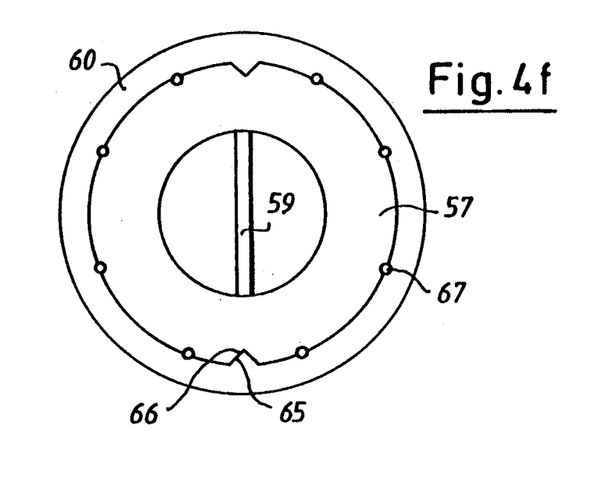
FIG. 4f is a front elevation view of the leaf spring bearing of FIG. 4e.

This stop body 57 must be inserted with a defined orientation into the holding body 60. To obtain an orientation of the stop body 57 relative to the spring 59 during assembly, the extensions of the holding bodies 60 are provided with guide rails 65 which engage in corresponding cutouts 66 of the stop body 57 (see FIG. 4f). The spacing 61 between the thickened portions 62 of the holding body 60 and the projections (58a, 58b) is unimportant when dimensioning the projections (58a, 58b). This spacing 61 can be freely selected.

The spacing 63 between the projections (58a, 58b) of the stop body 57 and the extension 64 of the holding body 60 and the spacings already described in FIGS. 4a to 4c are alone important. The distance 63 fixes the free space for movement of the leaf spring 59. After the stop body 57 is pushed into the interior of the extensions up to the stops as described with respect to FIGS. 4a to 4c, its position is fixed by weld points 67.

Figure 4G:
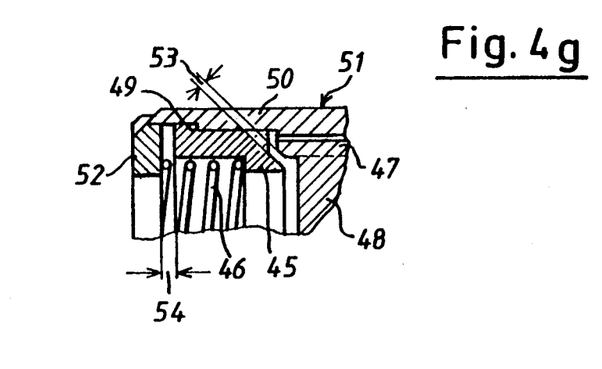
FIG. 4g shows the leaf spring bearing of FIG. 4a equipped with a spring pretensioned stop body.

Another variation of the stop is shown in FIG. 4g which permits an increase in the permissible range of the spring characteristic. With this stop, the stop body 45 is pressed into a fixed position via a press spring 46 in the direction toward the extension 47 for fixing the leaf spring 48.

The movement of the stop body 45 in the direction toward the leaf spring 48 is limited by a stop 49 in the extension 50 of the holding body 51. The pressure spring 46 is braced against a limit body 52 attached to the extension 50 of the holding body 51 and presses the stop body 45 firmly against the stop 49 in the load-free condition. The leaf spring 48 can only move freely after a movement thereof. After the leaf spring 48 has established the condition with its movement that the extension 47 bridges the distance 53 to the stop body 45, the further movements take place against the leaf spring 48 and the pressure spring 46 conjointly. For this purpose, the mutually opposite faces of the stop body 45 and the limit body 52 must have a certain spacing 54 with respect to each other.

In the realization of the embodiment of FIG. 4g, it is noted that the permitted limit range of the leaf spring is subdivided into first and second ranges. In the first range, the movement of the leaf spring 48 is undisturbed by the stop body 45. In contrast, the extension 47 for attaching the leaf spring 48 lies in the second range firmly against the stop body 45 and the movement of the leaf spring 48 takes place together with the movement of the stop body 45 until the spacing 54 to the limit body 52 is overcome. The total movement of the leaf spring 48 is then not greater than the movement of the leaf spring 28 in the embodiment shown in FIGS. 4a to 4c or as in the embodiment of FIG. 4e.

A different spring characteristic for the leaf spring is obtained in dependence upon whether the stop body provides a rigid or a spring pretensioned stop.

Figure 5:
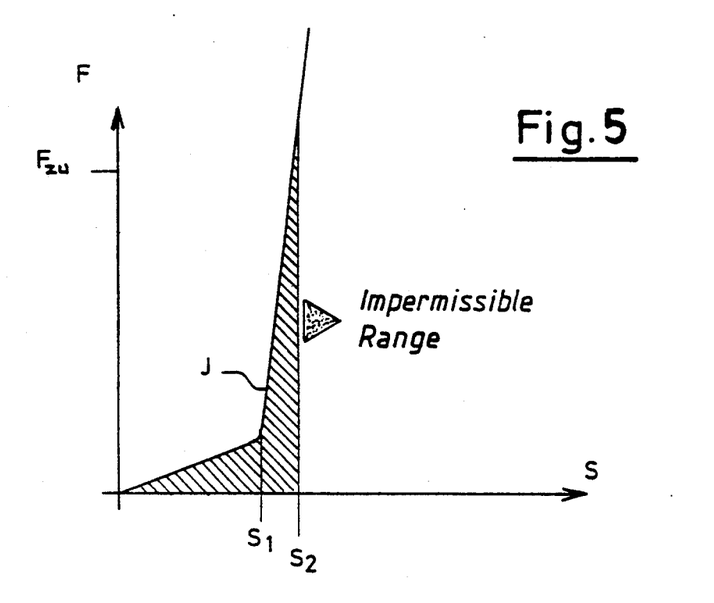
FIG. 5 is a spring characteristic for a rigid stop.

FIG. 5 shows a spring characteristic which is obtained for a rigid stop. The force which acts on the spring is shown along the ordinate axis. The movement corresponding to a particular force can be read off the abscissa axis. As can be seen in FIG. 5, a substantially linear relationship between the spring movement and the force corresponding thereto is provided in a first range up to S1. The spring lies against the stop after being displaced through the distance S1. Only a very much greater force ($>f_{zu}$) can move the spring into the impermissible range (S>S2) and thereby destroy the spring. The energy content J is relatively low in the relatively large limit gap S1. This can be disadvantageous for short impact loads.

Figure 6:
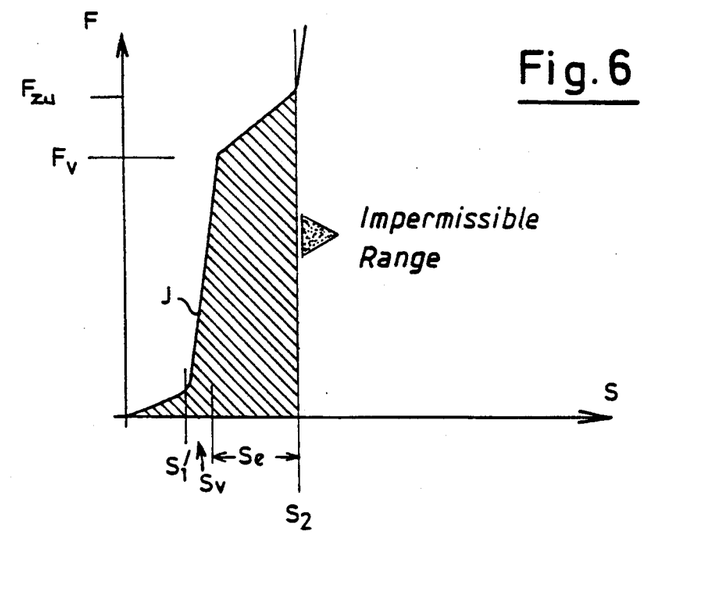
FIG. 6 is a spring characteristic for a spring pretensioned stop.

The situation is different when the stop is pretensioned. Here, the limit gap S1' is relatively small. When the spring lies against the stop after a relatively small movement with a linear relationship between the spring displacement S and the force F corresponding thereto, the required force F for only a small movement of the spring increases steeply. Only when the leaf spring has taken up the force of the stop spring on the stop body, does this steep range Sv end at Fv. Thereafter, and up to the limit S2 of the permissible range, a relatively linear flat climb of the spring characteristic follows. The movement of the spring takes place in common with the stop spring. If the permissible deflection S2 has taken place, then the stop body lies against the limit body. Any further movement of the spring then takes place only against the spring and leads however to a permanent deformation.

The range of the spring characteristic in the impermissible range is again steeper for the reasons mentioned above and the slope of the spring characteristic again corresponds to the slope of the spring characteristic for a rigid stop.

If the relatively small limit gap S1' is adequate for the function of the spring joint, then the spring pretensioned stop provides that a very much greater energy contact J is required in order to drive the spring into the impermissible range and thereby destroy the same. This configuration of the spring is then advantageous when the largest possible amount of energy is to be dissipated such as for a very short term shock is required.

It is understood that the foregoing description is that of the preferred embodiments of the invention and that various changes and modifications may be made thereto without departing from the spirit and scope of the invention as defined in the appended claims.

What is claimed is:

1. A spring joint for pivotably connecting two holding bodies, the spring joint comprising:
a first holding body;
a second holding body;

a resilient member having an elastic range through which said resilient member can bend and yet return to its original position;

said resilient member interconnecting said holding bodies so as to permit said first holding body to move through a distance relative to said second holding body while bending said resilient member when a load is applied to said first holding body;

stop body means for coacting with said first body to limit the bending of said resilient member to prevent said elastic range from being exceeded;

said stop body means being mounted relative to said first body to limit the movement of said resilient member in a first direction; and, said spring joint further comprising resilient biasing means for biasing said stop body means in a second direction opposite to said first direction.

2. The spring joint of claim 1, said stop body means being a fixed stop for limiting the movement of said first holding body so as to prevent said elastic range from being exceeded.

3. The spring joint of claim 1, said resilient member being a leaf spring.

4. A spring joint for pivotably connecting two holding bodies, the spring joint comprising:

a first holding body;

a second holding body;

a resilient member having an elastic range through which said resilient member can bend and yet return to its original position;

said resilient member interconnecting said holding bodies so as to permit said first holding body to move through a distance relative to said second holding body while bending said resilient member when a load is applied to said first holding body;

stop body means for coacting with said first body to limit the bending of said resilient member to prevent said elastic range from being exceeded; and, said holding bodies and said resilient member being machined from a single piece of material.

5. A spring joint for pivotably connecting two holding bodies, the spring joint comprising:

a first holding body;

a second holding body;

a resilient member having an elastic range through which said resilient member can bend and yet return to its original position;

said resilient member interconnecting said holding bodies so as to permit said first holding body to move through a distance relative to said second holding body while bending said resilient member when a load is applied to said first holding body;

stop body means for coacting with said first body to limit the bending of said resilient member to prevent said elastic range from being exceeded; and, said stop body means including two stop bodies for coacting with corresponding ones of said holding bodies; and, each of said stop bodies defining a contact region sufficiently large for receiving the holding body thereagainst without damage being caused to the stop body and the holding body.

6. The spring joint of claim 5, said resilient member developing a resilient force acting in a predetermined direction; and, said contact region being arranged so as to face into said predetermined direction.

7. The spring joint of claim 5, each of said holding bodies having an external extension for accommodating the corresponding one of said stop bodies therein.

8. The spring joint of claim 7, further comprising thread means for engaging the stop body in the extension corresponding thereto.

9. A spring joint for pivotably connecting two holding bodies, the spring joint comprising:

a first holding body;

a second holding body;

a resilient member having an elastic range through which said resilient member can bend and yet return to its original position;

said resilient member interconnecting said holding bodies so as to permit said first holding body to move through a distance relative to said second holding body while bending said resilient member when a load is applied to said first holding body;

stop body means for coacting with said first body to limit the bending of said resilient member to prevent said elastic range from being exceeded; and, said stop body means including a first ring mounted on said first holding body and a second ring mounted on said second holding body; and, said first ring having a diameter greater than the diameter of said second ring.

10. The spring joint of claim 9, further comprising threaded fastener means for fastening said rings to respective ones of said holding bodies.

* * * * *